United States Patent [19]

Hench et al.

[11] Patent Number: 5,222,092
[45] Date of Patent: Jun. 22, 1993

[54] LASER DYE IMPREGNATED SILICA SOL-GEL MONOLITHS

[75] Inventors: Larry L. Hench; Joseph H. Simmons; Bing-Fu Zhu; Romulo Ochoa, all of Gainesville, Fla.

[73] Assignee: University of Florida, Gainesville, Fla.

[21] Appl. No.: 550,871

[22] Filed: Jul. 11, 1990

[51] Int. Cl.$^5$ ............................................. H01S 3/14
[52] U.S. Cl. .................................................... 372/53
[58] Field of Search ................................... 372/53, 20

[56] References Cited

U.S. PATENT DOCUMENTS

| | | | |
|---|---|---|---|
| 3,541,470 | 3/1967 | Lankard et al. | 372/53 |
| 3,679,995 | 7/1972 | Sorokin et al. | 331/94.5 |
| 3,684,979 | 8/1972 | Myer et al. | 331/94.5 |
| 3,818,371 | 6/1974 | Herz et al. | 372/53 |
| 4,397,023 | 8/1983 | Newman et al. | 372/70 |
| 4,603,422 | 7/1986 | Fletcher et al. | 372/53 |
| 4,878,224 | 10/1989 | Kuder et al. | 372/53 |

OTHER PUBLICATIONS

Avnir et al. "The Nature of the Silica Cage as Reflected by Spectral Changes and Enhanced Photostability of Trapped Rhodamine 6G", J. Phys. Chem. vol. 88, pp. 5956-5959 (1984).
Hench et al., "Processing of Gel-Silica Monoliths for Optics," Journal of Non-Crystalline Solids, 121 (May, 1990).
Berry et al., "Characterization of Doped Sol-Gel Derived Silica Hosts for Use in Tunable Glass Lasers," J. Phys. D: Appl. Phys., vol. 22, pp. 1419-1422 (1989).
Hench et al., "Gel-Silica Optics," 878 SPIE 76 (1988).
Hench et al., "Multifunctional Silica Optics," presented at the MRS fall meeting in Boston, Mass. on Nov. 29, 1989.
Hench et al., "The Sol-Gel Process," 90 Chem. Rev. 33 (1990).
Kagan et al., Laser Focus, 26 (Sep. 1968).
Lee et al., "Water soluble Blue-Green Lasing Dyes for Flashlamp-Pumped Dye Lasers," IEEE J. Quantum Electron., vol. QE-16, 777 (1980).
Maeda, Laser Dyes (1984) (Cover sheet only).
Nogues et al., "Fast, Radiation-Hard Scintillating Detector: A Potential Application for Sol-Gel Glass," 17 J. Amer. Ceram. Soc. 1159 (1988).
O'Shea et al., Introduction to Lasers and Their Applications, pp. 167-176 (1977).
Pacheco et al., "A Solid-State Flashlamp-Pumped Dye Laser Employing Polymer Hosts," Proceedings of the International Conference on Lasers '87 (1987).
Sorokin et al., IBM Journal, vol. II, 130 (Mar. 1967).

*Primary Examiner*—James W. Davie
*Attorney, Agent, or Firm*—Finnegan, Henderson, Farabow, Garrett & Dunner

[57] ABSTRACT

The present invention relates to a dye laser comprising a highly porous, consolidated silica sol-gel monolith having incorporated therein at least one laser dye, wherein said dye laser is substantially solvent free. The dye laser is prepared by immersing a highly porous, consolidated silica sol-gel monolith in a solution of at least one laser dye and at least one solvent until the solution enters the pores of the monolith to a significant degree to form an impregnated silica sol-gel monolith, and then drying the impregnated silica sol-gel monolith to vaporize substantially all the solvent present within the pores of the monolith.

25 Claims, 5 Drawing Sheets

LASER DYE IMPREGNATED SILICA SOL-GEL MONOLITHS

This invention was funded in part with U.S. Government support under Contract No. F4960-88-0073/MDA972-88-J-1006 awarded by the U.S. Air Force. The U.S. Government has certain rights in this invention.

BACKGROUND OF THE INVENTION

Lasers (an acronym for light amplification by stimulated emission radiation) are light amplifying devices which produce high intensity pulses of monochromatic light concentrated in a well collimated beam commonly called a laser beam. The laser beam has found wide application in photography, communications, industrial measuring instruments and the like.

Various materials have been used as lasing media. For example, it is known that stimulated emission can be produced in various organic solutions. The first such solutions were of dyes, as reported by Sorokin et al., IBM Journal, Volume II, 130 (March 1967) and, since then, devices which have been used to produce such stimulated radiation have commonly been known as "dye lasers." Some materials which fluoresce or scintillate outside the visible spectrum also have been used. A compilation of materials which have served as the active material in dye lasers is provided in the above cited article of Sorokin et al. and in a review by Kagan et al. in Laser Focus, 26 (September 1968).

U.S. patents which describe dye lasers include U.S. Pat. Nos. 3,541,470; 3,679,995; 3,684,979; 3,818,371; 4,397,023; 4,603,422; and references cited therein.

The characteristics of traditional dye lasers which make them attractive are the possibilities of wide spectral range and tunability at low cost. The laser can be operated anywhere in the visible or into the ultraviolet or infrared ranges simply by changing to a solution which emits electromagnetic radiation at the desired spectral output point.

The output wavelengths of these traditional dye lasers are also tunable, either by varying the concentration of the solution, by varying the solvent, or by introducing a wavelength selective element such as a grating reflector into the optical cavity to control the emission wavelength. Significant spectral narrowing without significant energy reduction is an additional benefit obtained with the use of a grating reflector i.e., line widths less than 1 angstrom can be achieved in contrast to the 50-200 angstrom linewidths which are characteristic of dye laser emissions.

Typical dye lasers have been pumped with Q-switched ruby or glass lasers, or pumping has been accomplished with flashlamps. Pumping has been either in a longitudinal geometry, in which the pumping radiation is colinear with the optical cavity axis and the stimulated radiation, or in a transverse geometry, with the excitation beams at right angles to the optical cavity axis.

Traditional dye lasers have not achieved their full potential because of various disadvantages such as: (1) difficulty in pumping a number of useful materials because of low quantum efficiency or high excited state losses due to singlet-triplet transitions or due to triplet absorptions; (2) low conversion efficiencies, high coupling energy losses, and low repetition rates resulting from thermal effects induced during pumping; and (3) dye circulation problems and other limitations posed by thermal effects.

Several attempts have been made in the prior art to overcome these deficiencies by incorporating a traditional laser dye solution into a solid matrix. For example, Pacheco et al. attempted to solve the deficiencies set forth above by incorporating a laser dye solution into a polymer host such as polymethylmethacrylate, polycarbonate and polystyrene. *A Solid-State Flashlamp-Pumped Dye Laser Employing Polymer Hosts*, Proceedings of the International Conference on Lasers '87. Polymer hosts, however, are not ideal for dye laser applications because they possess low photostability and low thermal stability.

Another prior art attempt to solve the above-mentioned problem is disclosed in Avnir, *The Nature of the Silica Cage as Reflected by Spectral Changes and Enhanced Photostability of Trapped Rhodamine 6G*, J. Phys. Chem., Vol. 88, pp. 5956–5959 (1984). Avnir's article discloses the incorporation of Rhodamine 6G dye into a sol-gel derived silica matrix by adding the Rhodamine 6G dye to a silica sol prior to gellation. When a dopant compound is mixed into a sol before gellation, however, gradients are inevitably formed in the final product due to the migration of the dopant to the surface of the product during the subsequent aging and drying stages. Reaction byproducts are thus trapped within the matrix. Further, dye lasers prepared according to this method cannot be subjected to high temperature stabilization treatments without risking the decomposition of the incorporated Rhodamine 6G dye.

In Kuder et al. U.S. Pat. No. 4,878,224, attempt to overcome all of the aforementioned deficiencies by incorporating a solution of a laser dye and a solvent into a glass matrix and then sealing the glass matrix to prevent migration of any of the solution components out of the pores of the matrix. Dye lasers prepared according to Kuder et al., however, may be inefficient because solvent selection is highly critical. Not only must the solvent be compatible with the laser dye while in solution, but it must also possess photostability and thermal stability during lasing. Further, it is the solvent taken in combination with the laser dye, rather than the dye alone, which must provide adequate lasing effects.

Thus, there is a need in the art for dye lasers which have improved photochemical stability and high lasing efficiency. Further, these dye lasers should be convenient to handle as optical parts and should avoid the deficiencies of the prior art.

SUMMARY OF THE INVENTION

The present invention, which solves the problems of the prior art, relates to a dye laser comprising a highly porous, consolidated silica sol-gel monolith having incorporated therein at least one laser dye, wherein said dye laser is substantially solvent free.

The method of making a dye laser, according to the present invention, comprises:

(a) hydrolyzing and polycondensing one or more silicon alkoxide precursors to form a sol comprising a plurality of silica particles suspended in a liquid;

(b) cross-linking said silica particles to form a gel;

(c) aging said gel to form an aged gel;

(d) removing said liquid from said aged gel to form a dried, aged gel;

(e) stabilizing said dried, aged gel to form a highly porous, consolidated silica sol-gel monolith; and (f) immersing said highly porous, consolidated silica sol-gel monolith in a solution comprising at least one laser dye and at least one solvent until the solution enters the pores of the monolith to a significant degree to form a laser dye impregnated silica sol-gel monolith; and (g) drying said impregnated silica sol-gel monolith to vaporize substantially all the solvent present within the pores of said monolith to form a substantially solvent free laser dye impregnated silica sol-gel monolith.

The present invention further relates to a tunable lasing system having a laser cavity comprising (a) a dye laser medium comprising a highly porous, consolidated silica sol-gel monolith having incorporated therein at least one laser dye, wherein said dye laser medium is substantially solvent free, and (b) an optical pumping excitation means, such as a laser beam, operably coupled with said dye laser medium. The tunable lasing system can be operated with a pulsed or continuous optical damping mode.

BRIEF DESCRIPTION OF THE DRAWINGS

The present invention will be more readily understood by referring to the following drawings, in which.

DETAILED DESCRIPTION OF PREFERRED EMBODIMENTS

Figure 1:
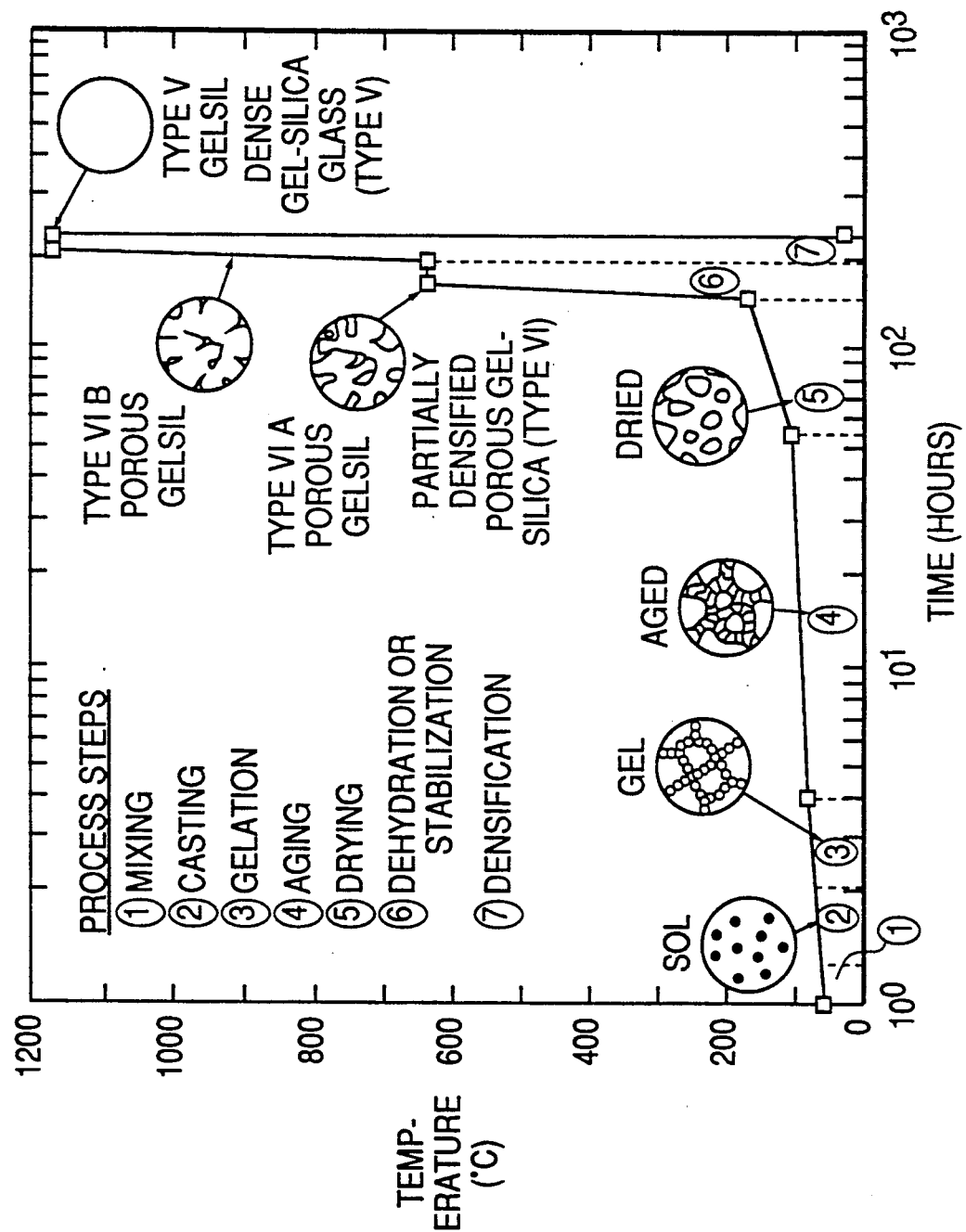
FIG. 1 illustrates the process of making the silica sol-gel monolith according to the present invention.

As explained above, there is a need in the art for dye lasers which have improved photochemical stability and high lasing efficiency and which are convenient to handle as optical parts. To achieve this goal, the present invention combines a highly porous, consolidated silica sol-gel monolith with a desired laser dye component to form a substantially solvent free dye laser. The advantages achieved were not possible until the present invention.

A dye laser according to the present invention comprises a highly porous, consolidated silica sol-gel monolith having incorporated therein at least one laser dye and is substantially solvent free. The dye laser structure can be in the form of a rod, a disk or any other desired shape. Preferably, however, the dye laser is in the form of a rod, with dimensions typically falling between about 0.5 to about 2.0 centimeters in diameter and between about 1.0 to about 10.0 centimeters in length.

The laser dye incorporated into the highly porous consolidated silica sol-gel monolith may occupy between about 1–100 percent of the surface area of the micropores of the monolith, preferably about 80–100 percent of the surface area of the micropores.

The laser dyes useful in the present invention include many organic compound which exhibits lasing activity. Maeda, *Laser Dyes* (1984), for example, lists a compilation of over 500 such lasing organic compounds and is hereby incorporated by reference. Particularly useful laser dye compounds are typically classified in accordance with chemical structures, such as cyanine, xanthenetriarylmethane, acridine, azine, chlorophyll, polyphenylene, condensed aromatic rings, coumarin, oxazole, phthalimide, pteridine, and the like.

Known laser dyes and their optical properties are described in D. O'Shea et al., *Introduction to Lasers and Their Applications* 167–176 (1977), which is hereby incorporated by reference. In FIG. 6.29 on page 171 of this text, dye laser output curves of laser dyes are illustrated over a 4000–8000 angstrom wavelength range, when pumped with an argon ion laser. The output curves are for carbostyril 165; coumarin 120; coumarin 2; 7-diethylamino-4-methylcoumarin; coumarin 102; coumarin 7; coumarin 6; sodium fluorescein; rhodamine 110; rhodamine B; cresyl violet perchlorate; and nile blue-A perchlorate.

Preferably, 4-{2-(5-phenyl-oxazolyl)}-1-methylpyridinium p-toluenesulfonate (4PyPO-MePTS) is used as the laser dye component in the present invention. The use of 4PyPO-MePTS as a laser dye was first suggested by L. A. Lee and R. A. Robb, *Water soluble Blue-Green Lasing Dyes for Flashlamp-Pumped Dye Lasers,* IEEE J. Quantum Electron., Vol. QE-16, 777 (1980).

The laser dye component of the present invention may be present in the dye laser at any concentration capable of exhibiting a lasing effect. Typically, however, the concentration varies from about $4.0 \times 10^{-5}$ to about 3.0 mg/cm$^3$ of the silica sol-gel monolith in which the laser dye is incorporated. A preferred concentration range is from about $1.0 \times 10^{-3}$ to about 2.0 mg/cm$^3$, and the concentration of from about 0.1 to about 1.0 mg gm/cm$^3$ is especially preferred.

The highly porous, consolidated silica sol-gel monolith used to form the dye laser of the present invention is preferably a Type VI gel-silica, more preferably a Type VIA gel-silica, wherein at least 80% of the pores of the highly porous, consolidated silica sol-gel monolith are interconnected, more preferably wherein at least 98% of the pores are interconnected.

Porous media can be divided into two distinct categories, consolidated and unconsolidated. Unconsolidated media is composed of discrete particles, and porosity in this media is dependent upon particle size and type of packing. A consolidated media is one in which the solid structure forms a continual and generally permanent network resulting from sintering, deposition from solution, polymeric growth or selective dissolution, to name a few methods. Type VI silica is a consolidated porous media and has been shown to possess virtually total interconnectivity.

The highly porous, consolidated silica sol-gel monolith used to make the dye laser according to the present invention is formed through a silica sol-gel process comprising the steps of:

(a) hydrolyzing and polycondensing one or more silicon alkoxide precursors to form a sol comprising a plurality of silica particles suspended in a liquid;

(b) cross-linking the silica particles to form a gel;

(c) aging the gel to form an aged gel;

(d) removing the liquid from the aged gel to form a dried, aged gel; and (e) stabilizing the dried, aged gel to produce the highly porous, consolidated silica sol-gel monolith.

Preferably, either HNO$_3$ or a combination of HNO$_3$ and HF is used as a catalyst for the hydrolysis reaction. More preferably, HNO$_3$ or a combination of HNO$_3$ and HF is first added to D.I. H$_2$O, and then one or more selected alkoxide precursors is mixed into this acid solution. The molar ratio of water to the alkoxide precursor is preferably kept at about 16.

The time and temperature of the stabilization step (e) above are both important in producing a highly porous, consolidated silica sol-gel monolith with well defined characteristics such as uniform pore size, a known pore surface area and a known total pore volume. Changes in these process parameters will influence the physical characteristics of the sol-gel, such as pore size, pore surface area and pore volume, within a very wide range. An important feature of the sol-gel process is that, with sufficient control of the kinetics and ultrastructure, it is possible to produce optically transparent pure silica components which have substantial quantities of interconnected pores of a size smaller than will scatter visible light and, with some grades of gel-silica, even ultraviolet light. This optically transparent porous silica is termed a Type VI silica.

By the term "transparent" or "transparency" as used throughout this specification, is meant a percent transmittance of 50% or greater.

The process schedule for highly porous, consolidated silica sol-gel monoliths is shown schematically in FIG. 1. This process is more fully described in: (1) an article by L. Hench et al. entitled *Gel-Silica Optics*, 878 SPIE 76 (1988); (2) an article by L. Hench et al. entitled *The Sol-Gel Process*, 90 Chem. Rev. 33 (1990); and (3) an article by J. Nogues et al. entitled *Fast, Radiation-Hard Scintillating Detector: A Potential Application for Sol-Gel Glass*, 17 J. Amer. Ceram. Soc. 1159 (1988). The disclosures of these documents are hereby expressly incorporated in their entirety by reference.

Figure 2:
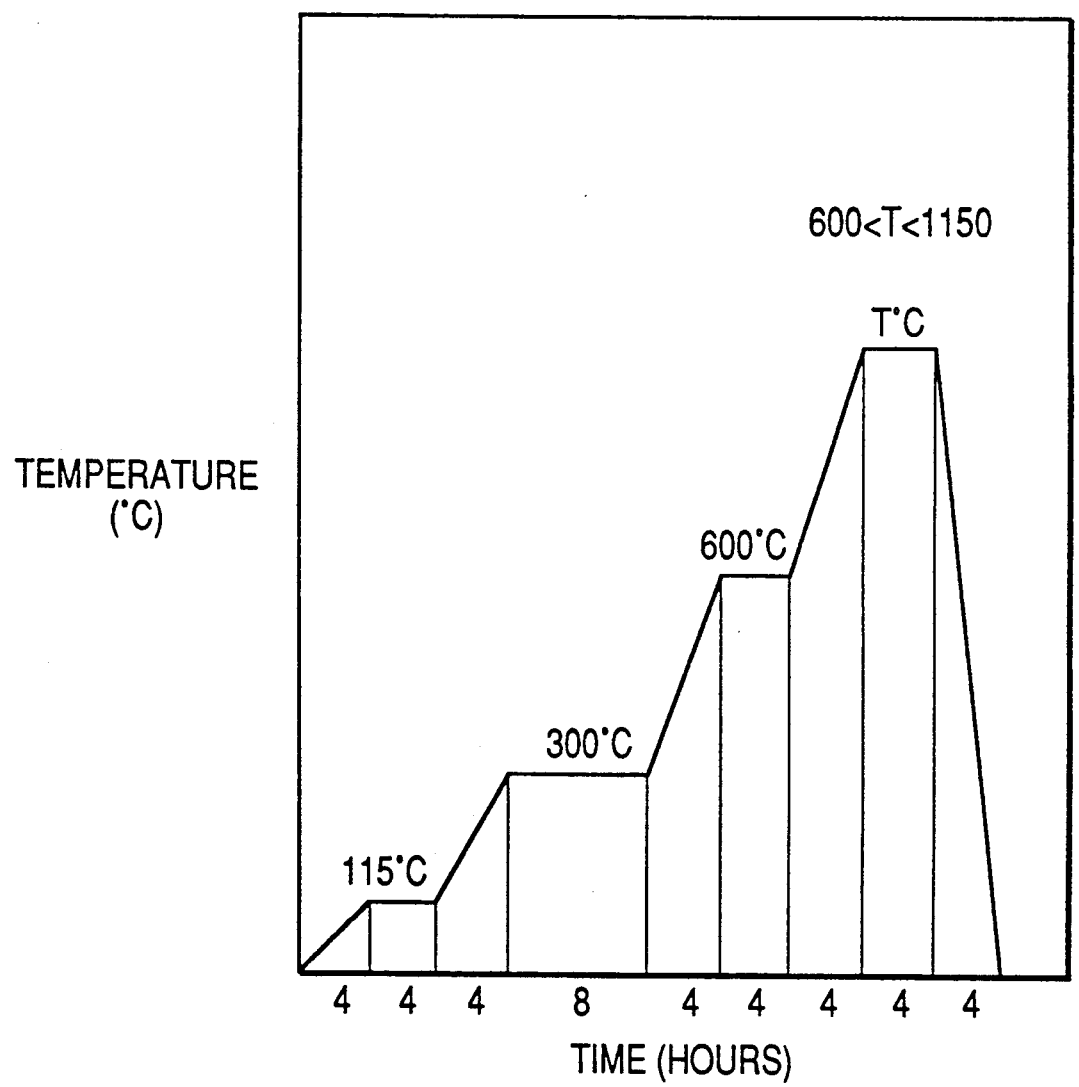
FIG. 2 illustrates the preferred temperature profile used to control the strength of the gel and its volume fraction of porosity.

The preferred temperature profile used to control the strength of the gel and its volume fraction of porosity is shown schematically in FIG. 2.

The silica sol-gel monoliths used to form the dye lasers according to the present invention, can be processed over a wide range of stabilization temperatures. Throughout this range of stabilization temperatures, the highly porous, consolidated silica sol-gel monolith is transparent through the visible and at least a part of the ultraviolet spectrum because the pores of the monolith have a very small average radius, for example, as small as 1.0 nm, and thus do not scatter light. The pore dimensions, specific surface area, and total pore volume of Type VI gel-silicas are commonly determined by the use of quantitative $N_2$ adsorption-desorption isotherms.

The step wherein the liquid is removed to form a dried, aged gel, step (d) above, can vary widely but is preferably carried out a temperature of from about 150° C. to about 180° C. The step wherein the dried, aged gel is stabilized, step (e) above, is typically carried out at a stabilization temperature of from about 180° C. to about 1,100° C., preferably from about 200° C. to about 950° C., and more preferably at a stabilization temperature of from about 600° C. to about 900° C. The duration of stabilization step (e) can vary greatly but typically lasts from about 10 to about 200 hours. Preferably, the stabilization step (e) lasts about 50 hours.

Figure 3:
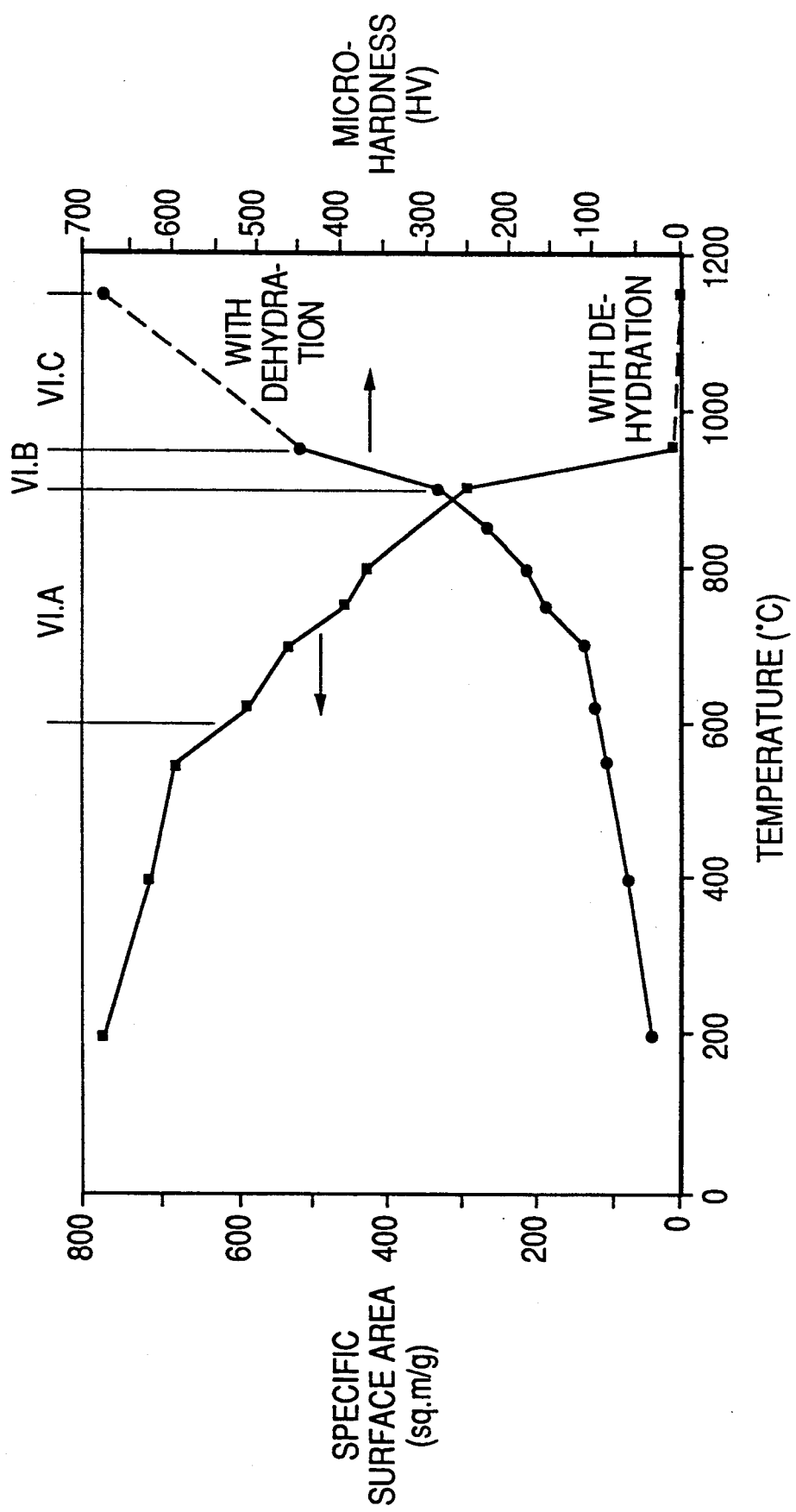
FIG. 3 illustrates the specific surface area and microhardness of Type VI porous gel-silicas.

Typically, there is little change in the size of the interconnected pores at stabilization temperatures of about 200° C. to about 900° C. However, the number of pores tends to decrease depending upon the heat treatment. Consequently, the specific area of the material typically varies from about 770 $m^2/g$ at about 200° C. to about 290 $m^2/g$ at about 900° C. (FIG. 3). Above about 900° C. as the stabilization temperature, the specific surface area tends to decrease down to about 10 $m^2/g$ at about 950° C. At 1150° C., with a dehydration treatment, the material usually no longer contains pores and has a surface area determined primarily by its external geometry, i.e., it is a fully dense silica.

Figure 4:
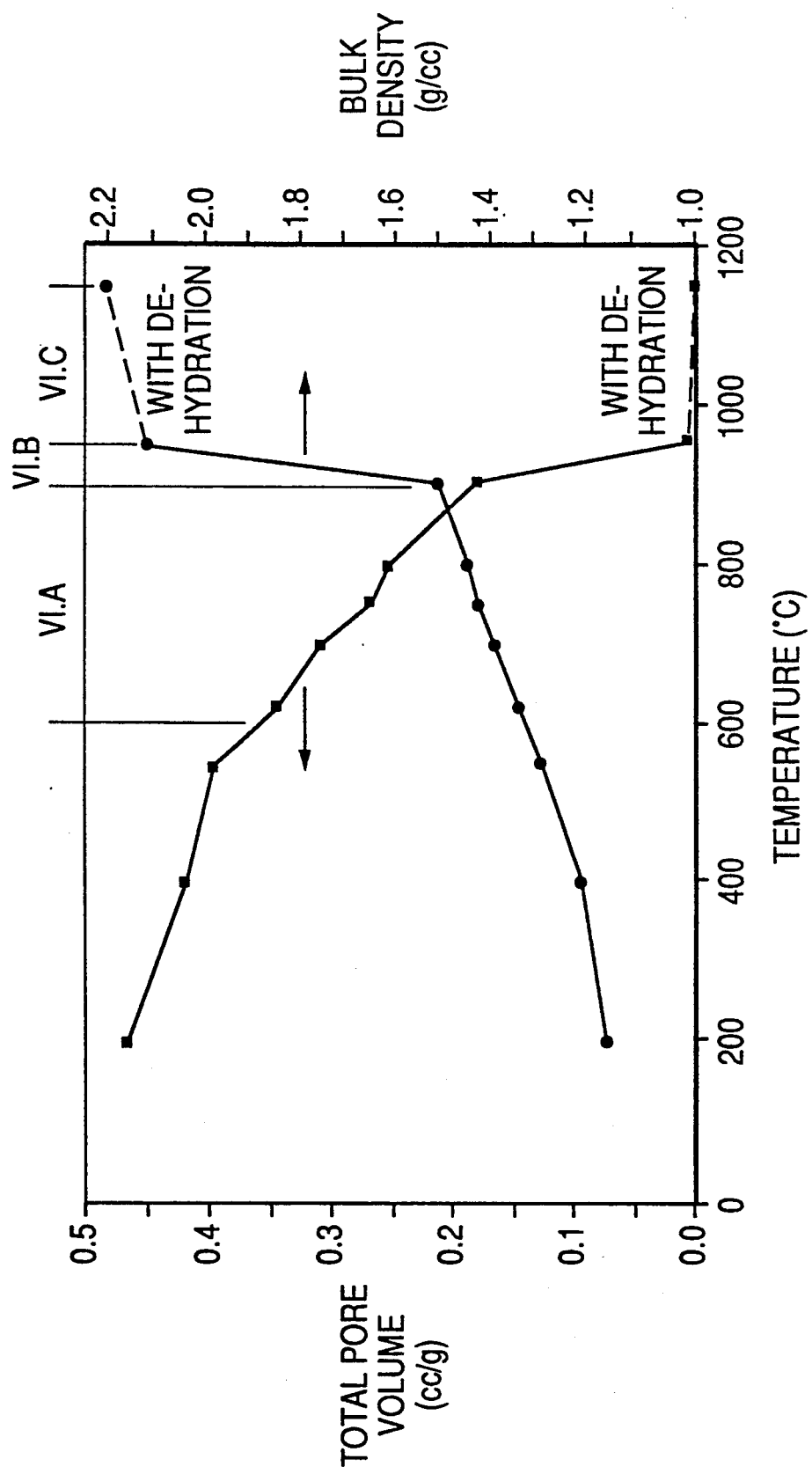
FIG. 4 illustrates total pore volume and bulk density of Type VI porous gel-silicas.

The change in ultrastructure of porous gel-silica shown in FIG. 3, for example, results in three regions of density and three subclasses of Type VI highly porous, consolidated silica sol-gel monoliths. FIG. 4 illustrates the density and total pore volume of Types VIA, VIB and VIC. A summary of the physical and ultrastructural characteristics of Type VIA, VIB and VIC highly porous, consolidated silica sol-gel monoliths is presented in Table I below.

TABLE 1

CHARACTERISTICS AND PROPERTIES OF TYPE VI POROUS GEL-SILICAS

| | Bulk Density (g/cc) | Total Pore Volume (cc/g) | Surface Area (sq. m/g) | Micro-Hardness (HV) | UV Cutoff (50% Trans.) |
|---|---|---|---|---|---|
| Type VI A | 1.3–1.5 | 0.17–0.37 | 290–620 | 100–285 | 290–300 |
| Type VI B | 1.5–2.1 | .01–.17 | 10–290 | 285–450 | 185–290 |
| Type VI C | 2.1–2.2 | 0.00–0.01 | 0–10 | 450–680 | 165–185 |

A highly porous, consolidated silica sol-gel monolith according to the present invention possesses an average pore radius which can vary widely depending on the desired mechanical strength, which tends to decrease as the pore radius increases. However, the average pore radius typically ranges from about 1.0 nm to about 12.0 nm, preferably from about 2.0 nm to about 8.0 nm and, even more preferably, from about 4.0 nm to about 6.0 nm. The total pore volume of the highly porous, consolidated silica sol-gel monolith may be from about 0.01 cc/g to about 1.2 cc/g, preferably from about 0.3 cc/g to about 0.90 cc/g.

The density of the highly porous, consolidated silica sol-gel monolith may be from about 0.4 g/cc to about 2.2 g/cc, and preferably is from about 1.35 g/cc to about 1.50 g/cc. The specific surface area of the monolith may be from about 10 $m^2/g$ to about 780 $m^2/g$, preferably from about 200 $m^2/g$ to about 770 $m^2/g$, and more preferably from about 290 $m^2/g$ to about 620 $m^2/g$.

The microhardness of the highly porous, consolidated silica sol-gel monolith according to the present invention may be from about 50 HV to about 680 HV, preferably from about 100 HV to about 285 HV, and may be polished to a surface finish of about 0.2 to about 20 microns, preferably about 0.5 to about 5 microns. The surface finish ranges define the size of any surface deformities, which cannot be smaller than the underlying pore size of the monolith. The surface finish is also directly related to the transmission capabilities of the monolith and thus the resulting dye laser.

In an especially preferred embodiment of the invention, the monolith is cast as a sol into a mold and gelled within the mold under conditions which produce the desired net shape and the desired net surface. In this preferred embodiment, no surface polishing is needed.

The highly porous, consolidated silica sol-gel monolith useful in a dye laser according to the present invention is preferably transparent for wavelengths of from about 160 nm to about 4.5 microns at about room temperature and preferably maintains this range of wavelengths at temperatures greater than about 50° C., more preferably at temperatures greater than about 100° C., even more preferably at temperatures greater than about 400° C. and, most preferably, at temperatures greater than about 1,000° C. The highly porous, consolidated silica sol-gel monolith is also preferably transparent for wavelengths of from about 160 nm to about 300 nm, and most preferably for wavelengths of about 160 nm to about 235 nm, at about room temperature.

The highly porous, consolidated silica sol-gel monolith according to the present invention preferably has a thermal shock resistance of greater than about 580° C./sec, more preferably from about 600° C./sec to about 1200° C./sec. The thermal shock resistance of porous Type VI gel-silica is typically about 700° C./sec.

Thermal shock resistance is generally a function of the ultrastructure and process history of gel-silica. To measure the thermal shock resistance of porous Type VI gel-silica, for example, samples were prepared which had been stabilized at different temperatures between 700° and 950° C. After heating to a specified temperature, each specimen was cooled down quickly either in ambient air (about 25° C.), by dropping into a room temperature liquid bath (about 25° C.), or by dropping into a liquid nitrogen bath (about −198.8° C.). Thermal shock resistance, as used herein, is defined as the maximum difference between the temperature the specimen was heated to and the temperature to which the specimen was quickly cooled without exhibiting cracks.

Table 2 below provides some underlying thermal shock resistance data of gel-silica and fully dense silica glass. The gels tested for Table 2 had two different average pore radii of 1.2 and 3.0 nm.

TABLE 2

EXPERIMENTAL DATA SHOWING THE THERMAL SHOCK RESISTANCE OF GEL-SILICA

| Pore Radius[1] (nm) | Processing Temp (°C.) | From 600° C. in Air | Cooling Condition From 700° C. in Air | From 700° C. in Acetone | From 800° C. in Air | From 1000° C. to LN |
|---|---|---|---|---|---|---|
| ~1.2 | 600 | C | NA | NA | NA | NA |
|  | 700 | m | m | c | — | NA |
|  | 800 | m | m | m | c | NA |
|  | 880 | m | m | m | c | NA |
|  | 950 | m | m | m | c | NA |
|  | 1150 | m | m | m | m | m |
| ~3.0 | 950 | NA | m | m | m | NA |

[1] As-dried specimens
2 Fully dense
LN Liquid nitrogen
C With cracks
m Monolithic without cracks
NA Not available In addition to a pure silica sol-gel matrix, it is sometimes desirable to use silica sol-gel matrices having additional materials incorporated therein to achieve other desired effects. Examples of such additional materials include, but are not limited to, oxides of alkalies, alkali earths and metals. Specific examples of these materials include $Na_2O$, $CaO$, $TiO_2$, $ZrO_2$ and $Al_2O^3$.

The dye laser of the invention is typically prepared by immersing a porous, consolidated silica sol-gel monolith in a solution comprising at least one laser dye and least one solvent until the solution enters the pores of the monolith to a significant degree to form an impregnated silica sol-gel monolith. The term "solvent" refers to a medium which is fluid at ambient temperatures and capable of dissolving a sufficient amount of the laser dye of the invention to exhibit lasing activity.

The laser dye component of the solution which is incorporated into the highly porous, consolidated silica sol-gel monoliths to form the dye lasers according to the present invention is preferably employed in a concentration of from about $10^{-4}$ to about $10^{-2}$ molar, more preferably in a concentration of about $10_{-3}$ to about $10^{-2}$ molar of the laser dye in the solution.

The solvent component of the solution may be a single solvent or a mixture of solvents. Suitable organic solvents include, but are not limited to, aliphatic, alicyclic and aromatic media such as n-octane, cyclohexane, methylene chloride, trichloroethylene, carbon tetrachloride, dibutyl ether, dioxane, tetrahydrafuran, dimethylformamide, ethanol, butanol, acetone, diethylketone, acetonitrile, benzene, chlorobenzene, toluene, xylene, mesitylene, and the like. Water or a mixture of water with a miscible organic solvent also can be utilized when the aqueous media is compatible with the laser dye component.

The step wherein the solvent is removed to form a substantially solvent free laser dye impregnated silica sol-gel monolith, step (g), can vary widely but is typically carried out at a temperature of from about 0° C. to about 300° C., preferably from about 10° C. to about 200° C., and most preferably from about 20° C. to about 100° C. The duration of this solvent removal step may last from about 2 hours to about 4 hours.

The substantially solvent free dye laser obtained after the solvent removal step (g) is characterized by having molecules of the laser dye physically adsorbed on the inner surfaces of the pores of the silica sol-gel matrix. In a preferred embodiment, the molecules of the laser dye are present in a solid state, such as a crystalline solid state, with no significant amount of solvent being present.

In a preferred embodiment of the invention, the dye laser is sealed with a coating or film rendering the surface of the dye laser nonporous with respect to the laser dye component incorporated within the silica sol-gel monolith and with respect to impurities in the environment outside the dye laser. Typical methods for sealing the outer surface of the silica sol-gel matrix include surface sealing such as by thermal gradient via localized heating, applying an organic or inorganic coating or other substance which effectively prevents the migration of the laser dye component out of and impurities into the dye laser, or lower temperature densification (Td) of the surface by doping an outer layer with low valence fluxing additives, such as Na, Li, B, Pb, and the like.

Preferably, the surface of the dye laser is sealed with a polymer, such as by dipping or spraying with an organic solution of the polymer. Suitable polymers for this purpose include, but are not limited to, poly(methyl methacrylate), polyvinyl acetate, polyvinyl chloride, polyurethane, polyethylene, epoxy resin, hydroxyethylcellulose, and the like. Inorganic materials, such as transparent metal coatings or nonporous sol-gel coatings, also may be used as surface sealants.

One of the most important characteristics of a dye laser is that the optical output is "tunable" over a wide frequency range. Because it is tunable, a dye laser is suitable for many applications such as spectroscopy, molecular dissociation, chemical reactions, and isotope separation.

As described in the "Dye Laser" text disclosed above, when the dye component of the dye laser is excited by an external source of short-wavelength light, the dye typically emits radiation at longer wavelengths, i.e., it fluoresces. The dye usually fluoresces over a broad band of visible frequencies.

The dye molecule has two groups of states, i.e. the singlet states ($S_0$, $S_1$, and $S_2$) and the triplet states ($T_1$ and $T_2$) The singlet states occur when the total spin of the excited electrons in each molecule is equal to zero. The triplet states occur when the total spin is unity. Singlet-triplet and triplet-singlet transitions are far less likely than transitions between two singlet or between two triplet states.

When the dye laser is pumped by the absorption of photons, the dye molecules are excited from the ground state $S_0$ to the first excited state $S_1$. There is a very rapid decay by a nonradiative process to the lowest energy states of $S_1$. The laser transition occurs between a state near the bottom of $S_1$ and an intermediate state in $S_0$ Since there are many vibrational-rotational sublevels within $S_0$ and $S_1$, the resulting emission line is very broad.

The triplet states $T_1$ and $T_2$ are not involved directly in the laser action, but they have a pronounced effect. There is a small probability that the forbidden transition $S_1 \rightarrow T_1$ (called an intersystem crossing) will occur. Since transition $T_1 \rightarrow S_0$ (phosphorescence) is also forbidden, the molecules tend to pile up in the $T_1$ state. The transition $T_1 \rightarrow T_2$, however, is allowed and it is a disadvantage that the range of frequencies for that transition coincides almost exactly with the range of laser transition frequencies. Once a significant fraction of the molecules have made the $S_1 \rightarrow T_1$ transition, the $T_1 \rightarrow T_2$ absorption quickly reduces the laser gain and can quench laser action. For this reason, conventional dye lasers operate on a pulsed basis with pulse durations shorter than the time that it takes for the population of the $T_1$ state to reach a significant value.

The broad tuning range made available by using different dyes as active media enables coverage of almost the entire visible range of wavelengths. Rhodamine 6G is specified in many dye laser systems because of its high efficiency (about 20 percent) and its broad tuning range. All dye lasers are optically pumped, and the primary requirement is that the pump light source has an output near the peak of the dye absorption band. By the nature of the dye, the laser output occurs at wavelengths longer than that of the excitation source. Rhodamine 6G, which fluoresces around 590 nm, is pumped by light in the 490-515 nm (blue-green) region of the spectrum. For a dye fluorescing in the deep blue, a pump source with ultraviolet output is required.

The type of pump source dictates not only the laser output range, but also the specific pumping configuration to be used. The first and simplest method of pumping a dye is to treat it as it were a solid-state crystal rod that is being optically pumped. In a conventional dye laser, a tube containing a flowing dye solution is placed in an elliptical reflector and pumped by a linear flashlamp. Flashlamp pumping yields peak power of several kilowatts and average powers on the order of 50 mW in the visible region.

It is also possible to pump dyes using a nitrogen laser as a source. The dye is optically pumped in a transverse geometry, with the fan-shaped beam from the pump laser focused into a region along one side of a cell containing a laser dye. The output windows on the ends of the cell may be either flat and antireflection-coated or tilted at the Brewster angle. The mirrors are external to the dye cell, so that a change of tuning range involves only a change of dye cell and a reorientation of frequency-selective devices located in the laser cavity. Because of the short wavelength of the nitrogen laser and its high peak power, dye-laser output can be achieved over a wide spectral region extending from 350–680 nm. The output pulse energy of a typical nitrogen laser is about one millijoule (100 kW peak for 10 nsec). The pumped dye laser output for these excitation levels varies between 2–200 microjoules.

Another widely used pumping source for a dye laser is the powerful blue-green lines or the ultraviolet lines of an argon ion laser. For many dyes that lase at wavelengths greater than 560 nm (yellow through red), the dye absorption bands cover the visible output of the argon laser. A dye, such as rhodamine 6G, can absorb nearly all of the visible output and convert more than 20 percent of the input energy into coherent output at the peak of its emission band.

Because of the extremely high small-signal gain of most laser dyes, only a small amount of the active laser dye component is needed. However, the intense absorption and subsequent heating of a small volume of a dye solution, plus the rapid buildup of the triplet-state population in a conventional dye laser, necessitates a continuous and rapid change of the pumped volume of dye solution. Failure to do so produces a heated dye that decomposes, resulting in increased absorptive losses for the system.

In the dye lasers of the present invention, which are substantially free of solvent, however, there are few, if any, interactions between the laser dye molecules and solvent molecules to contribute to stability problems. The result is a dye laser having improved photochemical stability. Further, higher lasing efficiency is achieved when there is substantially no solvent present.

Tuning the laser is accomplished by means of a wavelength-dispersing element such as prism wavelength selector. In some cases, a multiple Brewster prism configuration can be used for increased dispersion. In other cases, the gain of the dye is so high that a diffraction grating can serve as a combined end mirror and dispersive element.

For a grating with a normal set at an angle $\theta$ to the optic axis of the laser, a very narrow band of wavelengths satisfying the relationship m $\lambda = 2d \sin \theta$, wherein m is an integer, are diffracted back down the laser cavity. The grating order m is usually unity, and d is the distance between rulings of the grating. Other wavelengths are not returned to the cavity and experience high loss. The wavelength can be changed by merely rotating the grating to change the angle theta.

There are a number of other tuning elements that can be inserted into the dye laser cavity. One type used in commercial devices is a wedge filter. This filter consists of a substrate with three dielectric coatings. The first and third coatings form highly reflective mirrors; the middle coating is a wedge of dielectric material that provides a variable mirror separation. Together the coatings form a variable-width Fabry-Perot interferometer. By moving the wedge in a direction perpendicular to the cavity axis, the peak transmission of the filter is tuned to a different wavelength. The reduced loss at the new wavelength admits stimulated emission there.

Another device that can be used to tune a dye laser is a birefringement filter consisting of several quartz waveplates of different thicknesses. These plates are placed in the laser cavity at the Brewster angle such that the vertically polarized light in the cavity experiences no loss by reflection at the plate surfaces. The no-loss condition permits amplification of light in the cavity with high degree of linear polarization. The crystal axes of a quartz wave plate are oriented such that the plate behaves as a full waveplate for vertically polarized light if $\lambda_0$, the wavelengths in a vacuum, satisfies the relation $d(\eta_{slow} - \eta_{fast}) = m\lambda_0$ (m is an integer), where d is the distance traveled by the light in the plate. For other wavelengths, transmission of the vertically polarized light through the plate results in elliptical polarization. After reflection at an end mirror, this elliptically polarized light experiences loss by reflection at the next encounter with the waveplate surface. This loss prevents lasing at wavelengths that differ much from those satisfying the full-wave condition. Although a single thin plate can isolate one band within the lasing region, the resulting linewidth is approximately 0.3 nm, a value somewhat large for most applications. However, if a second waveplate twice the thickness of the first is also placed in the cavity, the linewidth is reduced to 0.1 nm. In some applications, a third plate twice the thickness of the second is inserted to further reduce the linewidth to less than 0.03 nm. Tuning the laser is accomplished by rotating the plates, which are mounted on a common stage, about the normal to the plate surfaces.

The following example is illustrative of the present invention and is not meant to limit the invention.

EXAMPLE

A sol was prepared by mixing tetramethylorthosilicate (TMOS) with an acid solution which was obtained by mixing $HNO_3$, HF and D.I. $H_2O$ for 5 minutes. The molar ratio of $H_2O$ to TMOS was kept at 16. Hydrolysis of the alkoxide proceeded rapidly due to catalysis by the acids. When hydrolysis was completed (about 10-30 minutes), the mixture became a transparent or slightly cloudy sol, depending on the average pore sizes obtained. After cooling to $\leq 40°$ C., the sol was cast to produce the desired shape at room temperature.

The resulting gel was then aged in the mold for 2 days to increase the degree of polymerization along with the strength of the gel.

The aged gel was then transferred from the mold into a drying chamber where it was dried at 180° C. for a total of 2-5 days. The texture of the gel was then manipulated by heating the gel to a critical temperature to control the total pore volume, surface area, and thickness of the adsorbed water layer, thus forming a stabilized silica sol-gel monolith. The temperature profile set forth in FIG. 2 was followed. The desired heat treatments increased the strength of the gel so that no cracking would occur during the subsequent impregnation step. The stabilized silica sol-gel monoliths were characterized as exhibiting average pore radii of $\leq 12$ angstroms and pore volume fractions of $\geq 0.46$.

The stabilized monoliths were then immersed in a laser dye solution comprising a mixture of D.I. $H_2O$ and about $6 \times 10^{-3}$M 4PyPO-MePTS. The monoliths were immersed in the solution for about one day, at which time they were then dried in a 60 $cm^3$ closed container with a pinhole in the cover.

The impregnated samples were then tested for lasing in the blue-green spectral region using a nitrogen laser pumping at 337.1 nm in a transverse configuration. The rectangular nitrogen laser beam was focused to a line within the sample. The testing system used was a PRA 1000 pulsed nitrogen laser in combination with a LN107 dye laser system, manufactured by Laser Photonics, Inc. of Orlando, Fla. The maximum input energy per pulse was 1.5 mJ, and the pulse duration was 800 picoseconds.

Figure 5:
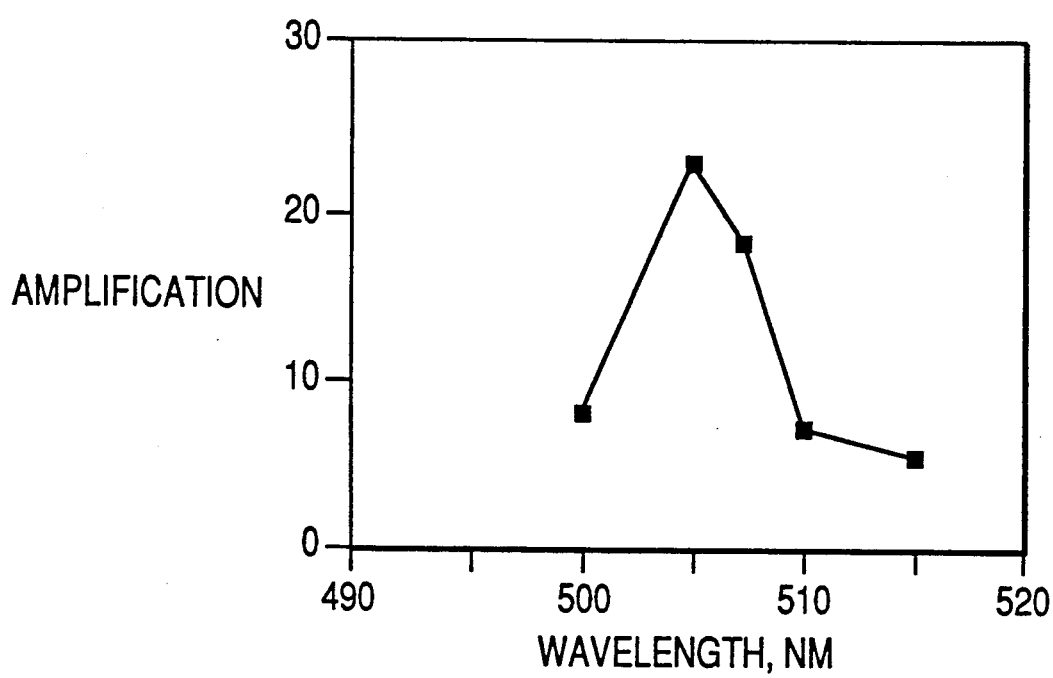
FIG. 5 illustrates amplification as a function of the wavelength for 4PyPo-MePTS impregnated Type VI porous silica.

Power outputs were measured at single modes after grating, and a gain of 23 was obtained at 509.5 nm with a half width of 0.3 nm. FIG. 5 illustrates the preliminary results of the amplifications at wavelengths between 500 nm and 515 nm.

It will be apparent to those skilled in the art that various modifications and limitations can be made in practicing the present invention. Thus, it is intended that the present invention cover the modifications and limitations of the invention provided they come within the scope of the appended claims and their equivalents.

What is claimed is:

1. A dye laser medium comprising a highly porous, consolidated silica sol-gel monolith having incorporated therein at least one laser dye, wherein said dye laser medium is substantially solvent free, and wherein said at least one laser dye is present in said dye laser medium in a concentration capable of exhibiting a lasing effect.

2. A dye laser medium according to claim 1, wherein said at least one laser dye is selected from the group consisting of cyanine, xanthenetriarylmethane, acridine, azine, chlorophyll, polyphenylene, coumarin, oxazole, phthalimide, pteridine and condensed aromatic ring compounds.

3. A dye laser medium according to claim 2, wherein said at least one laser dye is 4-{2-(5-phenyl-oxazolyl)}-1-methylpyridinium p-toluenesulfonate.

4. A dye laser medium according to claim 1, wherein said at least one laser dye is present in a concentration of from about $4.0 \times 10^{-5}$ to about 3.0 $mg/cm^3$ of said monolith.

5. A dye laser medium according to claim 1, wherein said highly porous, consolidated silica sol-gel monolith is formed through a silica sol-gel process comprising the steps of:
(a) hydrolyzing and polycondensing one or more silicon alkoxide precursors to form a sol comprising a plurality of silica particles suspended in a liquid;
(b) cross-linking said silica particles to form a gel;
(c) aging said gel to form an aged gel;
(d) removing said liquid from said aged gel to form a dried, aged gel; and
(e) stabilizing said dried, aged gel to form said highly porous, consolidated silica sol-gel monolith.

6. A dye laser medium according to claim 1, wherein said at least one laser dye is incorporated into said highly porous, consolidated silica sol-gel monolith by immersing said monolith in a solution comprising at least one laser dye and at least one solvent until the solution enters the pores of the monolith to a significant degree, and then drying said monolith to substantially vaporize all the solvent present within the pores of said monolith.

7. A dye laser medium according to claim 6, wherein said at least one solvent is selected from the group consisting of n-octane, cyclohexane, methylene chloride, trichloroethylene, carbon tetrachloride, dibutyl ether, dioxane, tetrahydrafuran, dimethylformamide, ethanol, butanol, acetone, diethylketone, acetonitrile, benzene, chlorobenzene, toluene, xylene, mesitylene water and mixtures of water with a miscible organic solvent.

8. A dye laser medium according to claim 7, wherein said at least one solvent is water or a mixture of water with a miscible organic solvent.

9. A dye laser medium according to claim 6, wherein said at least one laser dye is present in said solution in a concentration of from about $10^{-4}$ to about $10^{-2}$ molar.

10. A dye laser medium according to claim 9, wherein said at least one laser dye is present in said solution in a concentration of from about $10^{-3}$ to about $10^{-2}$ molar.

11. A dye laser medium according to claim 1, wherein the surface of said dye laser medium is sealed.

12. A tunable lasing system having a laser cavity comprising (a) a dye laser medium comprising a highly porous, consolidated silica sol-gel monolith having incorporated therein at least one laser dye, wherein said dye laser medium is substantially solvent free, (b) an optical pumping excitation means operably coupled with said dye laser medium and (c) a tuning means operably coupled with said dye laser medium.

13. A tunable lasing system according to claim 12 wherein said at least one laser dye is selected from the group consisting of cyanine, xanthenetriarylmethane, acridine, azine, chlorophyll, polyphenylene, coumarin, oxazole, phthalimide, pteridine and condensed aromatic ring compounds.

14. A tunable lasing system according to claim 13, wherein said at least one laser dye is 4-{2-(5-phenyl-oxazolyl)}-1-methylpyridinium p-toluenesulfonate.

15. A tunable lasing system according to claim 12, wherein said stabilized, highly porous silica sol-gel monolith is formed through a silica sol-gel process comprising the steps of:
(a) hydrolyzing and polycondensing one or more silicon alkoxide precursors to form a sol comprising a plurality of silica particles suspended in a liquid;
(b) cross-linking said silica particles to form a gel;
(c) aging said gel to form an aged gel;
(d) removing said liquid from said aged gel to form a dried, aged gel; and
(e) stabilizing said dried, aged gel to form said highly porous, consolidated silica sol-gel monolith.

16. A tunable lasing system according to claim 12, wherein said at least one laser dye is present in a concentration of from about $4.0 \times 10^{-5}$ to about 3.0 mg/cm$^3$ of said monolith.

17. A tunable lasing system according to claim 12, wherein said lasing system is capable of being operated with a pulsed optical damping mode.

18. A tunable lasing system according to claim 12, wherein said lasing system is capable of being operated with a continuous optical damping mode.

19. A lasing system having a laser cavity comprising (a) a dye laser medium comprising a highly porous, consolidated silica sol-gel monolith having incorporated therein at least one laser dye, wherein said dye laser medium is substantially solvent free and (b) an optical pump excitation means operably coupled with said dye laser medium.

20. A lasing system according to claim 19, wherein said at least one laser dye is selected from the group consisting of cyanine, xanthenetriarylmethane, acridine, azine, chlorophyll, polyphenylene, coumarin, oxazole, phthalimide, pteridine and condensed aromatic ring compounds.

21. A lasing system according to claim 20, wherein said at least one laser dye is 4-{2-(5-phenyl-oxazolyl)}-1-methylpyridinium p-toluenesulfonate.

22. A lasing system according to claim 19, wherein said highly porous silica sol-gel monolith is formed through a silica sol-gel process comprising the steps of:
(a) hydrolyzing and polycondensing one or more silicon alkoxide precursors to form a sol comprising a plurality of silica particles suspended in a liquid;
(b) cross-linking said silica particles to form a gel;
(c) aging said gel to form an aged gel;
(d) removing said liquid from said aged gel to form a dried, aged gel; and
(e) stabilizing said dried, aged gel to form said highly porous, consolidated silica sol-gel monolith.

23. A lasing system according to claim 19, wherein said at least one laser dye is present in a concentration of from about $4.0 \times 10^{-5}$ to about 3.0 mg/cm$^3$ of said monolith.

24. A lasing system according to claim 19, wherein said lasing system is capable of being operated with a pulsed optical damping mode.

25. A lasing system according to claim 19, wherein said lasing system is capable of being operated with a continuous optical damping mode.

* * * * *

UNITED STATES PATENT AND TRADEMARK OFFICE
CERTIFICATE OF CORRECTION

PATENT NO. : 5,222,092
DATED : June 22, 1993
INVENTOR(S) : Hench et al.

It is certified that error appears in the above-indentified patent and that said Letters Patent is hereby corrected as shown below:

In column 1, after the tile and before "BACKGROUND OF THE INVENTION" substitute the following paragraph:

--This invention was funded in part with U.S. Government support under Contract No. F49620-83-C-0072 with the U.S. Air Force and Contract No. MDA972-88-J-1006 with Defense Advanced Research Projects Agency. The U.S. Government has certain rights in this invention.--

Signed and Sealed this

First Day of November, 1994

Attest:

BRUCE LEHMAN

*Attesting Officer*     *Commissioner of Patents and Trademarks*